United States Patent
Kong et al.

(10) Patent No.: US 10,559,816 B2
(45) Date of Patent: Feb. 11, 2020

(54) SURFACE-TREATED POSITIVE ELECTRODE ACTIVE MATERIAL FOR LITHIUM SECONDARY BATTERY, METHOD FOR PREPARING THE SAME, AND LITHIUM SECONDARY BATTERY COMPRISING THE SAME

(71) Applicant: LG Chem, Ltd., Seoul (KR)

(72) Inventors: Woo Yeon Kong, Daejeon (KR); Hye Lim Jeon, Daejeon (KR); Sung Bin Park, Daejeon (KR); Wang Mo Jung, Daejeon (KR); Seong Hoon Kang, Daejeon (KR)

(73) Assignee: LG Chem, Ltd. (KR)

( * ) Notice: Subject to any disclaimer, the term of this patent is extended or adjusted under 35 U.S.C. 154(b) by 288 days.

(21) Appl. No.: 15/362,028

(22) Filed: Nov. 28, 2016

(65) Prior Publication Data

US 2017/0155132 A1    Jun. 1, 2017

(30) Foreign Application Priority Data

Nov. 30, 2015 (KR) .......................... 10-2015-0169174

(51) Int. Cl.
    *H01M 4/36*        (2006.01)
    *H01M 10/0525*     (2010.01)
    *H01M 4/485*       (2010.01)
    *H01M 4/525*       (2010.01)
    *H01M 4/505*       (2010.01)
    *H01M 4/131*       (2010.01)

(52) U.S. Cl.
    CPC ........... *H01M 4/366* (2013.01); *H01M 4/131* (2013.01); *H01M 4/485* (2013.01); *H01M 4/505* (2013.01); *H01M 4/525* (2013.01); *H01M 10/0525* (2013.01); *Y02T 10/7011* (2013.01)

(58) Field of Classification Search
    None
    See application file for complete search history.

(56) References Cited

U.S. PATENT DOCUMENTS

| | | | |
|---|---|---|---|
| 2011/0049418 A1* | 3/2011 | Dahn | H01M 4/58 252/182.1 |
| 2015/0024280 A1 | 1/2015 | Uchiyama | |
| 2016/0013513 A1* | 1/2016 | Gaben | H01M 10/0468 429/159 |

FOREIGN PATENT DOCUMENTS

KR    20130130862 A    12/2013

OTHER PUBLICATIONS

Jung, Sung-Kyun. Understanding the Degradation Mechanisms of LiNi0.5Co0.2Mn0.3O2 Cathode Material in Lithium Ion Batteries. Advanced Energy Materials, vol. 4, Issue 1, abstract only, Aug. 21, 2013 (Year: 2013).*

Naoaki Kumagai et al., "Intercalation of lithium in r.f.-sputtered niobium oxide film as electrode material for lithium-on batteries", Journal of Power Sources, 1995, vol. 54, pp. 175-179.

* cited by examiner

*Primary Examiner* — Sarah A. Slifka

(74) *Attorney, Agent, or Firm* — Lerner, David, Littenberg, Krumholz & Mentlik, LLP

(57) ABSTRACT

The present disclosure suppresses, by uniformly coating lithium transition metal composite oxide particles with $Li_wNb_xO_y$, ($1 \le w \le 8$, $1 \le x \le 13$, $1 \le y \le 20$), a direct contact between a positive electrode active material and a liquid electrolyte and thereby suppresses a side reaction between the positive electrode active material and the liquid electrolyte, and improves stability at high temperatures and high voltages, and in particular, is effective in enhancing battery performance by forming $Li_2O$—$Nb_2O_5$ through reacting the coating layer with Li present on the surfaces of the lithium transition metal composite oxide particles.

12 Claims, No Drawings

SURFACE-TREATED POSITIVE ELECTRODE ACTIVE MATERIAL FOR LITHIUM SECONDARY BATTERY, METHOD FOR PREPARING THE SAME, AND LITHIUM SECONDARY BATTERY COMPRISING THE SAME

FIELD OF THE INVENTION

The present application claims priority to and the benefits of Korean Patent Application No. 10-2015-0169174 filed with the Korean Intellectual Property Office on Nov. 30, 2015, the entire contents of which are incorporated herein by reference.

The present disclosure relates to a positive electrode active material for a lithium secondary battery, and in particular, to a positive electrode active material forming a coating layer including $Li_wNb_xO_y$ ($1 \le w \le 8$, $1 \le x \le 13$, $1 \le y \le 20$) on surfaces of lithium transition metal composite oxide particles.

DESCRIPTION OF THE RELATED ART

Since their appearances in 1991 as a small, lightweight and high-capacity battery, lithium secondary batteries have been widely used as a power source of portable devices. With recent rapid developments in electronics, communications and computer industries, camcorders, mobile phones, laptops and the like have appeared and gone through remarkable developments, and demands for lithium secondary batteries as an energy source driving these portable electronic, information and communication technology devices have continuously increased.

Recently, as one part to improve lithium secondary battery performance and increase stability, researches on positive electrode active materials used in the battery have been actively conducted.

As the positive electrode active material of the lithium secondary battery, lithium-containing cobalt oxides (LiCoO₂) have been mainly used until recently, and in addition thereto, the use of lithium-containing manganese oxides such as layer crystal-structured LiMnO₂ and spinel crystal-structured LiMn₂O₄, and lithium-containing nickel oxides (LiNiO₂) has been considered.

Among these, LiCoO₂ is currently much used due to its excellent general properties such as excellent cycle properties and its simple preparation method, however, LiCoO₂ has low safety and uses large amounts of high-priced cobalt, and therefore, has a limit to be used as a power source in fields using large amounts of batteries such as electric vehicles.

In addition, LiNiO₂ has received attention as a high capacity material since 70% or more of lithium may be reversibly charged and discharged while being less expensive than cobalt-based oxides, but has a problem of low stability. Particularly, among such nickel-based lithium composite oxides, nickel (Ni)-rich compositions having more than 50% of nickel content have a problem of battery property deterioration caused by charge and discharge. This is known to be due to nickel elution occurring from a positive electrode active material caused by a reaction of a positive electrode and a liquid electrolyte, and particularly, is known to cause decline in the high temperature cycle life properties. In addition, in the nickel (Ni)-rich compositions, decreases in structural stability and chemical stability, which lead to a decrease in the thermal stability of a positive electrode, particularly, thermal stability at high temperatures, have been pointed out as serious problems.

Accordingly, researches on the development of positive electrode active materials capable of solving high temperature stability problems while suited for high capacity by solving battery property deterioration occurring in a positive electrode active material having high nickel content have been required due to a side reaction caused by a direct contact between the positive electrode active material and a liquid electrolyte.

DISCLOSURE OF THE INVENTION

Technical Problem

The present disclosure is directed to providing a secondary battery suppressing, by uniformly coating surfaces of lithium transition metal composite oxide particles with $Li_wNb_xO_y$ ($1 \le w \le 8$, $1 \le x \le 13$, $1 \le y \le 20$), a direct contact between a positive electrode active material and a liquid electrolyte and thereby suppressing a side reaction between the positive electrode active material and the liquid electrolyte, and having improved stability at high temperatures and high voltages.

The present disclosure is also directed to providing a secondary battery having enhanced battery performance by forming $Li_2O$—$Nb_2O_5$ through reacting the coating layer with Li present on the surfaces of the lithium transition metal composite oxide particles.

Technical Solution

The present disclosure has been made in view of the above, and one embodiment of the present disclosure provides a positive electrode active material for a lithium secondary battery including lithium transition metal composite oxide particles; and a coating layer including $Li_wNb_xO_y$ ($1 \le w \le 8$, $1 \le x \le 13$, $1 \le y \le 20$) formed on surfaces of the lithium transition metal composite oxide particles.

Another embodiment of the present disclosure provides a method for preparing a positive electrode active material for a lithium secondary battery including a) preparing a reaction raw material of a niobium salt and a lithium salt; and b) depositing a coating layer including $Li_wNb_xO_y$ ($1 \le w \le 8$, $1 \le x \le 13$, $1 \le y \le 20$) on surfaces of lithium transition metal composite oxide particles represented by the following Chemical Formula 1.

$Li_{1+z}[Ni_aCo_bMn_c]O_2$ ($0.1 \le z \le 0.6$, $0.5 \le a \le 1$, $0 \le b$, $c \le 1$, $z+a+b+c=1$)   [Chemical Formula 1]

Still another embodiment of the present disclosure provides a positive electrode for a lithium secondary battery, a lithium secondary battery, a battery module and a battery pack including the positive electrode active material for a lithium secondary battery according to the present disclosure.

Advansageous Effects

The present disclosure is capable of providing a secondary battery suppressing, by uniformly coating surfaces of lithium transition metal composite oxide particles with $Li_wNb_xO_y$ ($1 \le w \le 8$, $1 \le x \le 13$, $1 \le y \le 20$), a direct contact between a positive electrode active material and a liquid electrolyte and thereby suppressing a side reaction between the positive electrode active material and the liquid electrolyte, and having improved stability at high temperatures and high voltages.

In addition, by the coating layer formed on the surfaces of the lithium transition metal composite oxide particles including $Li_2O$—$Nb_2O_5$, a secondary battery having enhanced battery performance is capable of being provided.

MODE FOR CARRYING OUT THE INVENTION

Hereinafter, the present disclosure will be described in more detail in order to illuminate the present disclosure. Herein, terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

The present disclosure provides a positive electrode active material for a lithium secondary battery including lithium transition metal composite oxide particles; and a coating layer including $Li_wNb_xO_y$, ($1 \leq w \leq 8$, $1 \leq x \leq 13$, $1 \leq y \leq 20$) formed on surfaces of the lithium transition metal composite oxide particles.

According to one embodiment of the present disclosure, the lithium transition metal composite oxide particles may be a positive electrode active material for a lithium secondary battery represented by the following Chemical Formula 1.

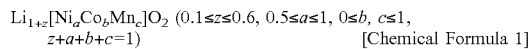

$Li_{1+z}[Ni_aCo_bMn_c]O_2$ ($0.1 \leq z \leq 0.6$, $0.5 \leq a \leq 1$, $0 \leq b$, $c \leq 1$, $z+a+b+c=1$) [Chemical Formula 1]

The lithium transition metal composite oxide particles are a nickel-based lithium transition metal oxide, and include nickel (Ni), manganese (Mn) and cobalt (Co), and the nickel content is 50% or greater based on the total transition metals.

In the present disclosure, the lithium transition metal composite oxide particles have nickel content of 50% or greater based on the total transition metals (based on moles), which is excessive, and therefore, high capacity may be exhibited. The nickel content in the lithium transition metal composite oxide particles may be 50% or greater or from 50% to 90% in a molar ratio based on the total transition metals, preferably 55% or greater, and more preferably 60% or greater. When the nickel content is less than 50%, high capacity is difficult to expect, and on the contrary, the content being greater than 90% is not preferred since structural stability and chemical stability decrease causing a significant decrease in the high temperature stability due to high reactivity with a liquid electrolyte.

In addition, the lithium transition metal composite oxide particles of the present disclosure include manganese (Mn) and cobalt (Co) as a transition metal together with nickel, and herein, the manganese content may be from 10% to 30% and preferably from 15% to 20% based on the total transition metals (based on moles), and the cobalt content may be from 10% to 30% and preferably from 15% to 20% based on the total transition metals.

The lithium transition metal composite oxide may include $LiNi_{0.5}Co_{0.2}Mn_{0.3}O_2$, $LiNi_{0.6}Co_{0.2}Mn_{0.2}O_2$, $LiNi_{0.7}Co_{0.15}Mn_{0.15}O_2$ and the like, and among these, $LiNi_{0.6}Co_{0.2}Mn_{0.2}O_2$ is preferred in terms of battery properties.

As described above, by uniformly dispersing and coating $Li_wNb_xO_y$ on nickel (Ni)-rich lithium transition metal oxide particle surfaces having nickel content of 50% or higher among transition metals as a layer-based positive electrode material including a ternary system, the present disclosure is capable of suppressing a direct contact between a positive electrode active material and an electrolyte and thereby suppressing a side reaction between the positive electrode active material and the electrolyte, and is capable of improving stability at high temperatures and high voltages.

The coating layer is uniformly coated on the surfaces of the lithium transition metal composite oxide particles of the present disclosure in a thin film form.

By uniformly coating the coating layer, the present disclosure may suppress generation of high resistance layer at high temperatures at which electrode reactions become active, and may prevent an ion conductivity decrease. As a result, positive electrode active materials suited for obtaining high outputs of batteries and high energy density of batteries may be prepared.

In addition, the coating may be carried out using deposition methods such as an atomic layer deposition method (ALD), a chemical vapor deposition method (CVD) or a sputtering method.

An atomic layer deposition method (ALD) is a deposition method carried out by a nano thin film deposition technology using a chemically adhering single atomic layer phenomenon. Specifically, molecular adsorption and substitution are alternately progressed on particle surfaces, which enables extra fine layer-by-layer deposition with an atomic layer thickness, and a coating layer thin film may be stacked as thin as possible.

An atomic layer deposition method (ALD) grows a thin film in atomic layer units and a thickness of the deposited thin film is determined depending on the number of cycles, and as a result, the thin film thickness may be very readily controlled. In addition, excellent properties are obtained in terms of thickness uniformity and reproducibility as well, and an advantage of lowering a deposition temperature is obtained since chemisorption of reaction raw materials is used.

A chemical deposition method (CVD) deposits particles that are formed through chemical reactions of gases on surfaces of the particles, and refers to a deposition method forming a thin film through a gas phase reaction by decomposing raw material gases using external energy. A sputtering method is one type of a vacuum deposition method, and refers to a method accelerating gases such as argon ionized through plasma generation under a relatively low degree of vacuum to crash the gases to a target, and spurting target atoms to make a film on a nearby substrate.

By using the coating method, the present disclosure is capable of uniformly and smoothly forming the coating layer to a few hundred nanometers (nm) or less, and accordingly, uniform surface coating is obtained on electrode surfaces as well as on positive electrode active material surfaces.

According to one embodiment of the present disclosure, the coating layer coating surfaces of the lithium transition metal composite oxide particles may include $Li_wNb_xO_y$, ($1 \leq w \leq 8$, $1 \leq x \leq 13$, $1 \leq y \leq 20$), and more preferably, may include $Li_wNb_xO_y$, ($1 \leq w \leq 4$, $1 \leq x \leq 5$, $1 \leq y \leq 20$).

Specifically, the coating layer may include lithium niobate including one or more types selected from the group consisting of $LiNb_3O_8$, $Li_2Nb_{13}O_{13}$, $Li_2Nb_2O_5$, $Li_{1.9}Nb_2O_5$, $Li_{1.7}Nb_2O_5$, $LiNbO_2$, $LiNbO_3$, $Li\ Nb_2O_9$, $Li_{10}Nb_2O_{10}$, $Li_3NbO_4$ and $Li_4Nb_6O_1$, and $LiNb_3O_8$, $Li_2Nb_2O_5$, $Li_{1.9}Nb_2O_5$, $Li_{1.7}Nb_2O_5$, $LiNbO_2$, $LiNbO_3$, $Li_{10}Nb_2O_{10}$ or $Li_3NbO_4$ is more preferred.

Niobium (Nb) included in the coating layer of the present disclosure is larger than a lithium ion in the size, and the coating layer has a tunnel (channel) through which lithium ions may pass, and therefore, lithium ions may be efficiently diffused through the coating layer. Accordingly, direct contact between a positive electrode active material and a liquid electrolyte is suppressed due to the coating, which suppresses a side reaction between the positive electrode active material and the liquid electrolyte, and a structure of diffusing lithium ions through the coating layer is present, and consequently, excellent effects advantageous for improving electrochemical properties are obtained.

According to one embodiment of the present disclosure, the coating layer may further include $Li_2O$—$Nb_2O_5$.

The coating layer including $Li_wNb_xO_y$ of the present disclosure may be present in various forms by reacting with Li present on surfaces of the lithium transition metal composite oxide particles, and the present invention may include $Li_2O$—$Nb_2O_5$.

*46 The $Li_2O$—$Nb_2O_5$ is a material exhibiting high electric conductivity of $10^{-6}$ S/cm, and by being present on the surfaces of the lithium transition metal composite oxide particles, a secondary battery with enhanced battery performance may be provided.

According to one embodiment of the present disclosure, the coating layer may be included in 0.05% by weight to 3% by weight and preferably in 0.01% by weight to 1% by weight with respect to the total weight of the positive electrode active material for a lithium secondary battery. The coating layer content may be 1% by weight or greater in a thermal stability aspect, and may be 0.5% by weight or less in output and cycle life property aspects.

According to one embodiment of the present disclosure, the coating layer may have a thickness of 10 nm to 500 nm and preferably 100 nm to 300 nm. The coating layer thickness may be 10 nm or greater in a thermal stability aspect, and may be 500 nm or less in output and cycle life property aspects.

In addition, a method for preparing a positive electrode active material for a lithium secondary battery according to the present disclosure may include a) preparing a reaction raw material of a niobium salt and a lithium salt; and b) depositing a coating layer including $Li_wNb_xO_y$ ($1 \le w \le 8$, $1 \le x \le 13$, $1 \le y \le 20$) on surfaces of lithium transition metal composite oxide particles represented by the following Chemical Formula 1.

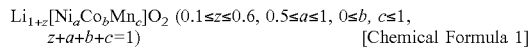

$Li_{1+z}[Ni_aCo_bMn_c]O_2$ ($0.1 \le z \le 0.6$, $0.5 \le a \le 1$, $0 \le b$, $c \le 1$, $z+a+b+c=1$)     [Chemical Formula 1]

The deposition in the b) step may be carried out using an atomic layer deposition method (ALD), a chemical vapor deposition method (CVD), a sputtering method or the like.

In addition, the present disclosure provides a positive electrode for a lithium secondary battery including the positive electrode active material for a lithium secondary battery according to the present disclosure, a binder, a conductor, an additive and a solvent, and a lithium secondary battery including the positive electrode for a lithium secondary battery.

The lithium secondary battery of the present disclosure may be manufactured according to common methods known in the art. For example, the lithium secondary battery may be manufactured by placing a separator between a positive electrode and a negative electrode, and introducing a lithium salt-dissolved liquid electrolyte thereto.

The electrode of the lithium secondary battery may also be prepared using common methods known in the art. For example, the electrode may be prepared by mixing a solvent, and as necessary, a binder, a conductor and a dispersion agent to a positive electrode active material or a negative electrode active material, and stirring the result to prepare slurry, and then applying (coating) the slurry on a current collector made of metal materials, and extruding and then drying the result.

Particularly, the positive electrode for a lithium secondary battery according to one embodiment of the present disclosure suppresses, by uniformly coating surfaces of lithium transition metal composite oxide particles with $Li_wNb_xO_y$ ($1 \le w \le 8$, $1 \le x \le 13$, $1 \le y \le 20$), a direct contact between a positive electrode active material and a liquid electrolyte and thereby suppresses a side reaction between the positive electrode active material and the liquid electrolyte, and may improve stability at high temperatures and high voltages, and, by forming $Li_2O$—$Nb_2O_5$ through reacting the coating layer with Li present on the surfaces of the lithium transition metal composite oxide particles, may enhance battery performance.

The positive electrode active material of the present disclosure is as described above, and as the negative electrode active material, carbon materials capable of lithium ion intercalation and deintercalation, lithium metal, silicon tin or the like may be commonly used. Carbon materials are preferably used, and both low crystalline carbon and high crystalline carbon may be used as the carbon material. Low crystalline carbon typically includes soft carbon and hard carbon, and high crystalline carbon typically includes natural graphite, Kish graphite, pyrolytic carbon, mesophase pitch based carbon fiber, mesocarbon microbeads, mesophase pitches and high-temperature baked carbon such as petroleum or coal tar pitch derived cokes.

The current collector made of metal materials is a metal having high conductivity and to which the slurry of the electrode active material may readily adhere, and any material may be used as long as it is not reactive in battery voltage ranges. Non-limiting examples of the positive electrode current collector include foil prepared from aluminum, nickel or combinations thereof, and the like, and non-limiting examples of the negative electrode current collector include foil prepared from copper, gold, nickel or copper alloys, or combinations thereof, and the like.

The conductor is not particularly limited as long as it may be generally used in the art, and examples thereof may include artificial graphite, natural graphite, carbon black, acetylene black, Ketjen black, denka black, thermal black, channel black, carbon fiber, metal fiber, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium oxide, polyaniline, polythiophene, polyacetylene, polypyrrole, combinations thereof, or the like, and generally, carbon black-based conductors are often used.

The binder is not particularly limited as long as it may be generally used in the art, and generally, polyvinylidene fluoride (PVdF), copolymers of polyhexafluoropropylene-polyvinylidene fluoride (PVdF/HFP), poly(vinyl acetate), polyvinyl alcohol, polyethylene oxide, polyvinylpyrrolidone, alkylated polyethylene oxide, polyvinyl ether, poly(methyl methacrylate), poly(ethyl acrylate), polytetrafluoroethylene (PTFE), polyvinyl chloride, polyacrylonitrile, polyvinylpyridine, styrene-butadiene rubber, acrylonitrile-butadiene rubber, ethylene propylene diene monomer (EPDM) or mixtures thereof may be used.

The liquid electrolyte included in the lithium secondary battery according to the present disclosure may be a mixed organic solvents of one or more selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate and butyl propionate.

In addition, the liquid electrolyte according to the present disclosure may further include a lithium salt, and an anion of the lithium salt may be one or more types selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The lithium secondary battery according to the present disclosure may be a cylinder-type, a square-type or a pouch-type secondary battery, but is not limited thereto as long as it corresponds to a charge and discharge device.

In addition, the present disclosure provides a battery module including the lithium secondary battery as a unit cell, and a battery pack including the same.

The battery pack may be used as a power supply of one or more types of medium to large sized devices selected from the group consisting of power tools; electric vehicles including electric vehicles (EV), hybrid electric vehicles (HEV) and plug-in hybrid electric vehicles (PHEV); or systems for power storage.

Hereinafter, examples of the present disclosure will be described in detail so as for those skilled in the art to readily carry out the present disclosure. However, the present disclosure may be implemented in various different forms and is not limited to the examples described herein.

EXAMPLE

1) Preparation of Surface-Coated Positive Electrode Active Material

Lithium niobate thin film coating was carried out on surfaces of lithium transition metal composite oxide particles ($LiNi_{0.6}Co_{0.2}Mn_{0.2}O_2$) through an atomic layer deposition method using a commercially-available Savannah 100 system (Cambridge Nanotech.).

Nb ethoxide ($Nb(OC_2H_5)_5$) and Li methoxide ($LiOCH_3$) were used as raw materials of the lithium niobate, and they were injected into a chamber of the Savannah 100 system with Ar, a carrier gas, and the flow rate was 40 ml/min.

After that, Ar, an inert gas, was injected into the chamber for purging, and then water vapor was injected thereto. Next, Ar, an inert gas, was injected thereto again for purging, and impurities were removed.

After that, the process of forming a thin film carried out by injecting the raw materials of lithium niobate into the chamber of the Savannah 100 system (Cambridge Nanotech.) was repeated 3 times again, and as a result, lithium transition metal composite oxide particles having lithium niobate thin film having a thickness of approximately 200 nm formed thereon were obtained.

2) Preparation of Positive Electrode for Lithium Secondary Battery

Positive electrode slurry was prepared by mixing the positive electrode active material ($LiNi_{0.6}Mn_{0.2}Co_{0.2}O_2$) prepared above, a binder (KF1100) and a conductor (Super-C) in a weight ratio of 93:4:3, respectively, in a solvent (N-methyl-2-pyrrolidone, NMP).

The positive electrode slurry was applied on one surface of an aluminum (Al) thin film, a positive electrode current collector, having a thickness of 20 μm, and the result was dried to prepare a positive electrode, and the positive electrode was processed using roll press.

3) Manufacture of Lithium Secondary Battery

In addition, negative electrode slurry was prepared by mixing a negative electrode active material (carbon powder), a binder (SBR) and a conductor (carbon black) in a weight ratio of 93:4:3, respectively, in a solvent (N-methyl-2-pyrrolidone, NMP). The negative electrode slurry was coated on a copper (Cu) thin film, a negative electrode current collector, having a thickness of 10 μm, and the result was dried to prepare a negative electrode, and the negative electrode was processed using roll press.

A liquid electrolyte was prepared by dissolving 1 mol of $LiPF_6$ in a solvent adding vinylene carbonate to a solvent mixing ethylene carbonate, diethyl carbonate and dimethyl carbonate in a volume ratio of 1:1:2.

After manufacturing a battery with the positive electrode and the negative electrode together with a separator using a common method, the liquid electrolyte prepared above was injected thereto to complete the manufacture of a lithium secondary battery.

Comparative Example

A lithium secondary battery was manufactured in the same manner as in Example except that, in the preparation of the positive electrode active material of Example, the coating layer was not formed.

Descriptions on the present disclosure provided above are for illustrative purposes only, and it is to be construed that those skilled in the art may readily modify the present disclosure to other specific forms without changing technological ideas or essential characteristics of the present disclosure. Accordingly, embodiments that have been described are for illustrative purposes in all aspects and need to be construed to be non-limitative.

What is claimed is:

1. A positive electrode active material for a lithium secondary battery comprising:
 lithium transition metal composite oxide particles; and
 a coating layer including $Li_wNb_xO_y$ ($1 \leq w \leq 8$, $1 \leq x \leq 13$, $1 \leq y \leq 20$) formed on surfaces of the lithium transition metal composite oxide particles,
wherein the lithium transition metal composite oxide particles are represented by the following Chemical Formula 1:

$Li_{1+z}[Ni_aCo_bMn_c]O_2$ ($0 \leq z \leq 0.6$, $0.6 \leq a \leq 1$, $0 \leq b$, $c \leq 1$, $z+a+b+c=1$), and [Chemical Formula 1]

wherein the coating layer further includes $Li_2O$—$Nb_2O_5$,
wherein the coating layer is included in 0.05% by weight to 3% by weight with respect to a total weight of the positive electrode active material.

2. The positive electrode active material for a lithium secondary battery of claim 1, wherein the coating layer includes one or more types selected from the group consisting of $LiNb_3O_8$, $Li_2Nb_{13}O_{13}$, $Li_2Nb_2O_5$, $Li_{1.9}Nb_2O_5$, 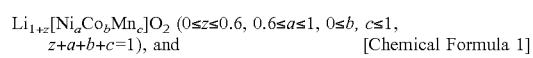 $Li_{1.7}Nb_2O_5$, $LiNbO_2$, $LiNbO_3$, $Li_8Nb_2O_9$, $Li_{10}Nb_2O_{10}$, $Li_3NbO_4$ and $Li_4Nb_6O_{17}$.

3. The positive electrode active material for a lithium secondary battery of claim 1, wherein the $Li_2O$—$Nb_2O_5$ is formed by reacting the coating layer with Li present on the surfaces of the lithium transition metal composite oxide particles.

4. The positive electrode active material for a lithium secondary battery of claim 1, wherein the coating layer has a thickness of 10 nm to 500 nm.

5. A positive electrode for a lithium secondary battery comprising:
- a positive electrode active material;
- a binder;
- a conductor;
- an additive; and
- a solvent,
- wherein the positive electrode active material is the positive electrode active material for a lithium secondary battery of claim 1.

6. A lithium secondary battery comprising:
- a positive electrode;
- a negative electrode;
- a liquid electrolyte; and
- a separator,
- wherein the positive electrode is the positive electrode for a lithium secondary battery of claim 5.

7. A battery module comprising the lithium secondary battery of claim 6 as a unit cell.

8. A battery pack comprising the battery module of claim 7.

9. A device comprising the battery pack of claim 8.

10. The device of claim 9, wherein the device is a power tool, electric vehicle, hybrid electric vehicle, plug-in hybrid electric vehicle or a system for power storage.

11. A method for preparing the positive electrode active material for a lithium secondary battery of claim 1, the method comprising:
- a) preparing a reaction raw material of a niobium salt and a lithium salt;
- b) depositing a coating layer including $Li_wNb_xO_y$ ($1 \leq w \leq 8$, $1 \leq x \leq 13$, $1 \leq y \leq 20$) on surfaces of lithium transition metal composite oxide particles represented by the following Chemical Formula 1:

$$Li_{1+z}[Ni_aCo_bMn_c]O_2 \ (0.1 \leq z \leq 0.6, \ 0.6 \leq a \leq 1, \ 0 \leq b, \ c \leq 1, \ z+a+b+c=1), \text{ and} \quad \text{[Chemical Formula 1]}$$

- c) forming $Li_2O$—$Nb_2O_5$ by reacting the coating layer with Li present on the surfaces of the lithium transition metal composite oxide particles, and
- wherein the deposition in the step (b) is carried out using an atomic layer deposition method (ALD).

12. The method for preparing the positive electrode active material for a lithium secondary battery of claim 11, wherein a thickness of the coating layer deposited on the surfaces of the lithium transition metal composite oxide particles is adjusted to a range of 10 nm to 500 nm by repeating the b) step 1 time to 30 times.

* * * * *